(12) United States Patent
Heine et al.

(10) Patent No.: US 7,641,370 B2
(45) Date of Patent: Jan. 5, 2010

(54) LIGHTING APPARATUS FOR A VEHICLE CAB

(75) Inventors: Christoph Heine, Nürnberg (DE); Dirk-Achim Schevardo, Kainsbach (DE); Frank Ertel, Erlangen (DE)

(73) Assignee: Diehl Aerospace GmbH, Ueberlingen (DE)

( * ) Notice: Subject to any disclaimer, the term of this patent is extended or adjusted under 35 U.S.C. 154(b) by 83 days.

(21) Appl. No.: 11/731,473

(22) Filed: Mar. 30, 2007

(65) Prior Publication Data

US 2008/0080197 A1   Apr. 3, 2008

(30) Foreign Application Priority Data

Sep. 28, 2006   (DE) .................. 20 2006 014 933 U

(51) Int. Cl.
*F21V 21/00* (2006.01)

(52) U.S. Cl. ................. 362/471; 362/470; 362/479; 362/490

(58) Field of Classification Search ............. 362/470, 362/471, 477–479, 487, 488, 490, 543
See application file for complete search history.

(56) References Cited

U.S. PATENT DOCUMENTS

| | | | |
|---|---|---|---|
| 2005/0264047 A1* | 12/2005 | Bauer | 297/180.13 |
| 2006/0085100 A1* | 4/2006 | Marin-Martinod et al. | 701/3 |
| 2007/0061847 A1* | 3/2007 | Callahan et al. | 725/76 |

* cited by examiner

*Primary Examiner*—Sandra L O'Shea
*Assistant Examiner*—Meghan K Dunwiddie
(74) *Attorney, Agent, or Firm*—Laurence A. Greenberg; Werner H. Stemer; Ralph E. Locher

(57) ABSTRACT

A lighting apparatus for a vehicle cab or cabin, having a plurality of reading lights for a plurality of passenger seats. A number of the reading lights is at least equal to the number of passenger seats, and a mean distance between the reading lights is less than a shortest possible distance between the passenger seats.

18 Claims, 1 Drawing Sheet

LIGHTING APPARATUS FOR A VEHICLE CAB

CROSS-REFERENCE TO RELATED APPLICATION

This application claims the priority, under 35 U.S.C. § 119, of German patent application DE 20 2006 014 933.3, filed Sep. 28, 2006; the prior application is herewith incorporated by reference in its entirety.

BACKGROUND OF THE INVENTION

Field of the Invention

The present invention relates to a lighting apparatus for a cab for vehicles, buses, marine vessels and similar vehicles, in particular a lighting apparatus having a plurality of reading lights for a plurality of passenger seats.

A conventional lighting apparatus of this type, as is used, by way of example, in aircraft cabins, is illustrated schematically in FIG. 2. At least one row with a plurality of passenger seats 12 is provided in the aircraft cabin 10. Baggage compartments 14 are normally disposed in the overhead area above the passenger seats 12, and a plurality of reading lights 16 are also fitted, in addition to various indications (for example "No Smoking", "Fasten Seatbelt") in a so-called passenger services unit (PSU) channel. The reading lights 16 are located somewhat above the passenger seats 12 and they are directed to throw a light beam 18 in the direction of its assigned passenger seat 12. Since the PSU channels frequently have to accommodate further components (for example oxygen cartridges), the reading lights 16 cannot be arranged at equal intervals above the passenger seats 12, and it is also necessary to provide the capability to adjust the reading lights 16 in the longitudinal direction of the cab or cabin 10 (right/left direction in FIG. 2).

In modern vehicles and in the case of business-class passenger seats 12, the controls 20 for the reading lights 12 are integrated in the passenger seats 12. A higher-level control apparatus 22 (so-called cabin management system (CMS)) receives the on/off signals from the control appliances 20 via signal lines 24, and switches the respective reading lights 16 on and off via control signal lines 26. For this purpose, the control apparatus 22 contains a configuration database with a clear association between the control appliances 20 and the passenger seats 12 on the one hand, and the reading lights 16 on the other hand.

As illustrated in FIG. 2, with conventional lighting apparatuses of this type, one reading light 16 is arranged above each passenger seat 12. When the vehicle cab or cabin 10 is reconfigured, for example when economy-class passenger seats are replaced by business-class passenger seats, the number, position and adjustment of the reading lights 16 must be matched to the new arrangement of the passenger seats 16. This is done by mechanical conversion of the reading lights 16, and is thus associated with a considerable installation and time penalty. A further disadvantage is that empty spaces which are created by the conversion must be bridged by so-called in-fill panels of different length.

SUMMARY OF THE INVENTION

It is accordingly an object of the invention to provide a lighting system for an aircraft cabin, which overcomes the above-mentioned disadvantages of the heretofore-known devices and methods of this general type and which, in particular, allows the lighting apparatus to be matched easily and with little effort when the passenger seats are reconfigured.

With the foregoing and other objects in view there is provided, in accordance with the invention, a lighting apparatus for a vehicle cab or cabin, comprising:

a plurality of passenger seats disposed in the vehicle cab or cabin with a shortest possible distance therebetween;

a plurality of reading lights for said passenger seats, wherein a number of said reading lights is at least equal to a number of said passenger seats, and a mean distance between said reading lights is less than said shortest possible distance between said passenger seats.

In other words, the lighting apparatus for a vehicle cab or cabin having a plurality of reading lights for a plurality of passenger seats is characterized in that the number of the reading lights is at least equal to the number of passenger seats, and the mean distance between the reading lights is less than the shortest possible distance between the passenger seats.

The subject matter of the present invention is based on the concept of "over-installation" of reading lights in the vehicle cab or cabin so that at least one reading light is associated with each passenger seat in every possible configuration of the passenger seats, without any need to mechanically convert the reading lights. The mechanical conversion effort is, for example, replaced by adaptation of control software for the reading lights.

In one preferred refinement of the invention, the lighting apparatus also has a control apparatus, which associates the reading lights with the passenger seats in accordance with a location plan of the reading lights and a location plan of the passenger seats. The reading lights which are not associated with the passenger seats can then be operated by the control apparatus for other lighting purposes (dimmed lighting for the vehicle cab or cabin, design). Or, in a possible configuration, several reading lights may be used to provide a sort of flood lighting for a given seat.

The lighting apparatus according to the invention can advantageously be used for aircraft, buses, marine vessels and similar vehicles with vehicle cabs or cabins with a plurality of passenger seats.

Other features which are considered as characteristic for the invention are set forth in the appended claims.

Although the invention is illustrated and described herein as embodied in lighting apparatus for a vehicle cab, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
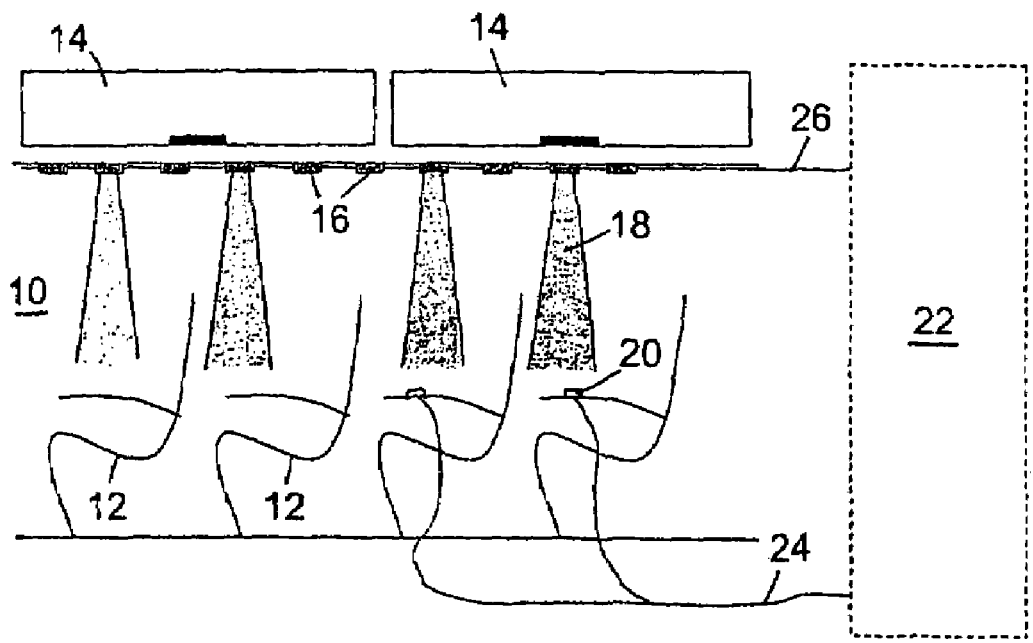
FIG. 1 shows a schematic illustration of the configuration of a vehicle cab or cabin having a lighting apparatus according to one preferred exemplary embodiment of the present invention.

Referring now to the figures of the drawing in detail FIG. 1 illustrates one preferred exemplary embodiment of the invention. Although the following text describes the invention using the example of an aircraft cabin, it can also be applied in an analogous manner to other vehicle cabs or cabins having a plurality of passenger seats, for example in buses, marine vessels, and the like. Furthermore, in the exemplary embodiment shown in FIG. 1, the same reference numerals are used for the same and/or corresponding components as in the case of the lighting apparatus according to the prior art, as described above.

FIG. 1 shows, schematically, an aircraft cabin 10 with a plurality of passenger seats 12 arranged one behind the other. The following statements also apply, of course, analogously to aircraft cabins 10 having a plurality of parallel seat rows which are each essentially of the same configuration.

A plurality of baggage compartments 14 are arranged above the passenger seats 12. A so-called passenger services unit (PSU) channel runs underneath the baggage compartments 14 and, for example, contains warning and information indications as well as further components such as oxygen cartridges. A plurality of reading lights 16 are arranged in the PSU channel, or preferably in a panel provided alongside it, in order to direct a light beam 18 in the direction of the passenger seats 12.

Figure 2:
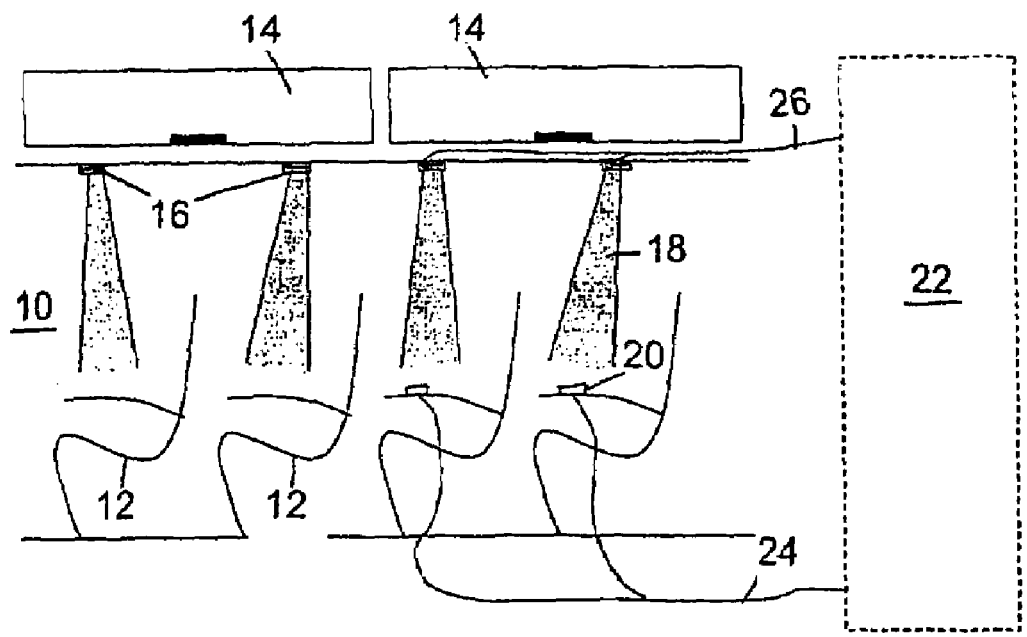
FIG. 2 shows a schematic illustration of the configuration of a vehicle cab or cabin with a prior art lighting apparatus.

In contrast to conventional lighting apparatuses (see FIG. 2), the reading lights 16 are arranged with a mean distance between them which is considerably less than the shortest possible distance between the passenger seats 12 in the aircraft cabin 10. The reading lights 16 are also preferably arranged at equal intervals. This means that at least one reading light 16 is associated with each passenger seat 12 in every possible arrangement of the passenger seats 12, so that there is no need to convert the reading lights 16 when the passenger seats 12 are reconfigured. This therefore avoids the time-consuming conversion, involving considerable installation effort, for the reading lights 16 of conventional lighting apparatuses. This is achieved by the "over-installation" of reading lights 16, that is to say considerably more reading lights 16 are provided than would be necessary for one configuration of passenger seats.

The reading lights 16 are arranged one behind the other in the overhead area above the passenger seats 12, and are preferably switched on and off via control appliances 20, in order to make passenger control easier, with these control appliances 20 being integrated in the passenger seats 12. The on/off signals for these control appliances 20 are supplied via signal lines 24 to a control apparatus 22, for example in the form of a so-called cabin management system (CMS).

A configuration database is stored in the control apparatus 22, containing a location plan of the passenger seats 12 (LOPA-layout of passenger area) and a location plan of the reading lights 16. A physical-to-logical mapping (PLM) algorithm for the control apparatus 22 determines the optimum reading light 16, or lights 16, in the location plan for each passenger seat 12 in the current location plan. When a switch-on signal for a reading light is produced via the control appliance 20 at a passenger seat 12, and is sent to the control apparatus 22 via the signal line 24, then the control apparatus 22 operates the optimum reading light 16 (or, lights 16 for a flood light effect) for the passenger seat 12, via the control signal line 26 (for example a bus line). In a further configuration it may be possible for the control appliance 20 to transmit selective signals to the control apparatus 22 to switch the reading light(s) 16. This, again is easily implemented in the control apparatus 22. For instance, a first toggle actuation at the seat may turn on a single light 16, a second toggle actuation may turn on the flood light, and a third toggle actuation may turn off the reading light(s) altogether.

On reconfiguration of the aircraft cabin 10, for example when some of the economy-class passenger seats 12 are being replaced by business-class passenger seats 12 with a greater distance between them, it is sufficient to read the new location plan of the passenger seats 12 to the control apparatus 22. This process can be made easier by a standardized file. There is no need for conversion and readjustment of the reading lights 16. In addition, there is no need for any adjustment mechanism for the reading lights 16.

Due to the "over-installation" of the available lights, it would appear possible in some cases (especially for larger seating, as in business class) to allow the system to turn on two or more lights for one seat. That could easily be done by adapting the PLM (physical/logic mapping). The result would probably be better "flood" lighting of the passenger area.

The proposed lighting apparatus for vehicle cabs or cabins 10 replaces the mechanical movement and adjustment devices, as well as the manual installation effort for conversion, by a greater number of reading lights 16 and adaptation by means of software in the control apparatus 22. This simplifies the configuration of the lighting apparatus, and considerably reduces the installation and time penalty for reconfiguration of a vehicle cab or cabin 10.

Since there is no need for the adjustment mechanism for the reading lights 16, and proven LED technology is also available for reading lights, the reading lights 16 can now be physically very lightweight and small. This allows "over-installation" of a large number of reading lights (despite the resultant additional weight) particularly when there is a requirement for the weight to be as low as possible, for example in particular in the case of aircraft.

Furthermore, the reading lights 16 need no longer be installed in the PSU channel itself but, for example, can be integrated in an adjacent panel.

In one preferred embodiment, those reading lights 16 in the lighting apparatus which are not associated with any passenger seat 12 in the current configuration of the control apparatus 22 can be operated by the control apparatus 22 for other lighting purposes. For example, these further reading lights 16 can be included in a highly dimmed form as effect lights in lighting scenarios in the aircraft cabin, for mood lighting, or they can be used for design purposes.

We claim:

1. A lighting apparatus for a vehicle cab or cabin, comprising:
a plurality of passenger seats disposed in the vehicle cab or cabin at different seating arrangement configurations with different spacing distances between said passenger seats, including a shortest possible distance between said passenger seats;
a plurality of reading lights for said passenger seats, wherein a number of said reading lights is at least equal to a number of said passenger seats, and a mean distance between said reading lights, in a direction along the spacing distance between said passenger seats, is less than said shortest possible distance between said passenger seats.

2. The lighting apparatus according to claim 1, wherein said reading lights are disposed at equal intervals.

3. The lighting apparatus according to claim 1, which further comprises a control apparatus configured to associate respective said reading lights with respective said passenger seats in accordance with a location plan of said reading lights and a location plan of said passenger seats.

4. The lighting apparatus according to claim 3, wherein respective said reading lights not associated with a respective said passenger seat may be operated by said control apparatus for other lighting purposes.

5. The lighting apparatus according to claim 1, wherein said reading lights are provided in an overhead area above said passenger seats.

6. The lighting apparatus according to claim 1, wherein said reading lights are disposed in a panel.

7. The lighting apparatus according to claim 1, which comprises controls for said reading lights integrated at said passenger seats.

8. In combination with a lighting system of an aircraft, a bus, or a marine vessel having a cab or cabin, a lighting apparatus according to claim 1.

9. In combination with an aircraft, a bus, or a marine vessel, the lighting apparatus according to claim 1 for controlling reading lights for a plurality of passenger seats.

10. A lighting apparatus for a vehicle cab or cabin, comprising:
- a plurality of passenger seats disposed in the vehicle cab or cabin in a given seating arrangement;
- a plurality of reading lights for said passenger seats disposed in an overhead area above said passenger seats, wherein a number of said reading lights is greater than a number of said passenger seats; and
- a control apparatus connected to said reading lights and configured to select respective said reading lights for operation in dependence on the seating arrangement of said passenger seats in said vehicle cab or cabin.

11. The lighting apparatus according to claim 10, wherein said reading lights are disposed at equal intervals.

12. The lighting apparatus according to claim 10, wherein said control apparatus is configured to associate respective said reading lights with respective said passenger seats in accordance with a location plan of said reading lights and a location plan of said passenger seats.

13. The lighting apparatus according to claim 12, wherein respective said reading lights not associated with a respective said passenger seat may be operated by said control apparatus for other lighting purposes.

14. The lighting apparatus according to claim 10, wherein said reading lights are disposed in a panel.

15. The lighting apparatus according to claim 10, which comprises controls for said reading lights integrated at said passenger seats.

16. In combination with a lighting system of an aircraft, a bus, or a marine vessel having a cab or cabin, a lighting apparatus according to claim 10.

17. In combination with an aircraft, a bus, or a marine vessel, the lighting apparatus according to claim 10 for controlling reading lights for a plurality of passenger seats.

18. A lighting apparatus for a vehicle cab or cabin, comprising:
- a plurality of reading lights for passenger seats;
- a plurality of passenger seats mountable in the vehicle cab or cabin with a shortest possible distance therebetween;
- a number of said reading lights being at least equal to a number of said passenger seats; and
- a mean distance between said reading lights being less than the shortest possible distance between said passenger seats.

* * * * *